(12) United States Patent
Rope et al.

(10) Patent No.: US 6,917,478 B2
(45) Date of Patent: Jul. 12, 2005

(54) SCANNING HEAD LENS ASSEMBLY

(75) Inventors: Ronald E. Rope, Denver, CO (US); Martin L. Pullam, Littleton, CO (US)

(73) Assignee: T Squared G, Inc., Denver, CO (US)

( * ) Notice: Subject to any disclaimer, the term of this patent is extended or adjusted under 35 U.S.C. 154(b) by 0 days.

(21) Appl. No.: 10/902,919

(22) Filed: Aug. 2, 2004

(65) Prior Publication Data

US 2005/0052749 A1 Mar. 10, 2005

Related U.S. Application Data

(62) Division of application No. 10/116,668, filed on Apr. 5, 2002, now Pat. No. 6,771,421, which is a continuation of application No. 09/689,282, filed on Oct. 12, 2000, now abandoned, which is a division of application No. 09/210,470, filed on Dec. 14, 1998, now Pat. No. 6,252,715, which is a continuation of application No. 08/816,688, filed on Mar. 13, 1997, now Pat. No. 5,870,227.

(51) Int. Cl.[7] .............................................. G02B 17/00
(52) U.S. Cl. ....................................... 359/730; 359/726
(58) Field of Search ................................ 359/618, 619, 359/622, 623, 625–627, 633, 726, 730, 731

(56) References Cited

U.S. PATENT DOCUMENTS

| | | | |
|---|---|---|---|
| 3,657,473 A | 4/1972 | Corcoran | |
| 4,054,361 A | 10/1977 | Noguchi | |
| 4,093,964 A | 6/1978 | Aughton | |
| 4,874,920 A | 10/1989 | Yamazaki et al. | |
| 5,008,686 A | 4/1991 | Saito | |
| 5,212,710 A | 5/1993 | Kaneda et al. | |
| 5,359,588 A | 10/1994 | Fujita et al. | |
| 5,453,877 A | * 9/1995 | Gerbe et al. | 359/633 |
| 5,724,163 A | * 3/1998 | David | 359/15 |
| 5,870,227 A | 2/1999 | Rope et al. | |
| 6,215,598 B1 | 4/2001 | Hwu | |
| 6,252,715 B1 | 6/2001 | Rope et al. | |
| 6,339,504 B1 | 1/2002 | Oliva | |
| 6,611,385 B2 | * 8/2003 | Song | 359/630 |
| 6,616,287 B2 | * 9/2003 | Sekita et al. | 359/858 |
| 6,653,989 B2 | * 11/2003 | Nakanishi | 345/7 |
| 6,825,987 B2 | * 11/2004 | Repetto et al. | 359/633 |

* cited by examiner

Primary Examiner—Ricky Mack
(74) Attorney, Agent, or Firm—Rothwell, Figg, Ernst & Manbeck

(57) ABSTRACT

An optical head assembly, method, and procedure which generates and then precisely positions multiple light beams onto a target. The system diffracts an input light source into a multiple light beam pattern, or initially generates a multiple light beam pattern, in which individual beams of the multiple light beam pattern are precisely spaced, corrected, focused and directed through a two axis plane to the target with minimal movement of any components of the optical head assembly. Such individual beams can also be individually modulated.

3 Claims, 17 Drawing Sheets

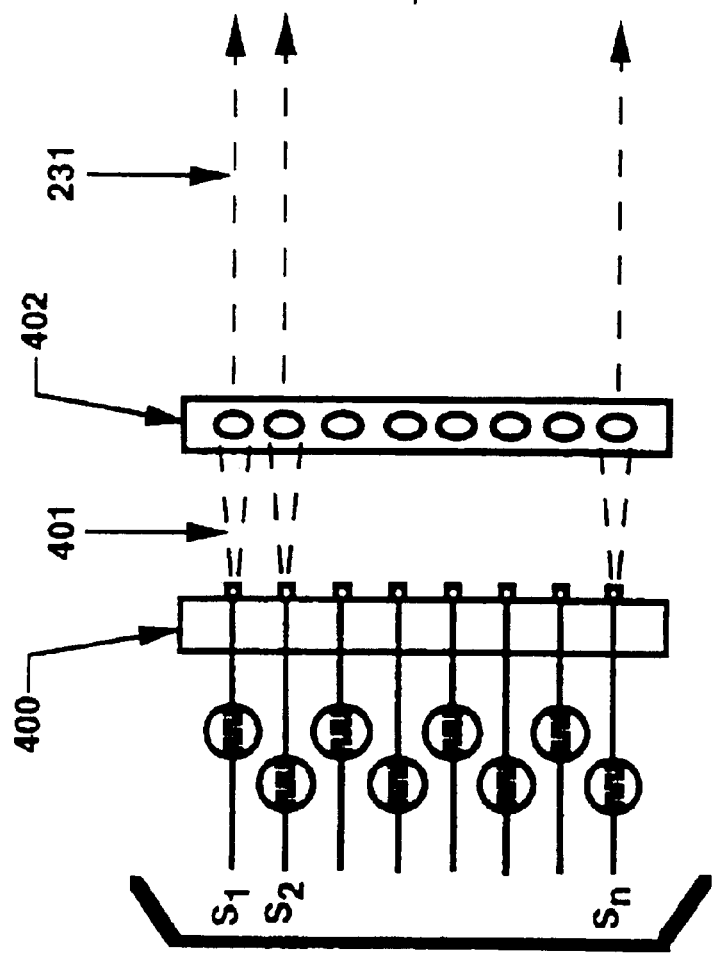
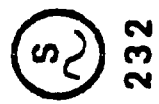
Figure 16

SCANNING HEAD LENS ASSEMBLY

This application is a DIV of Ser. No. 10/116,668 Apr. 5, 2002 U.S. Pat. No. 6,771,421, which is a CON of Ser. No. 09/689,282 Oct. 12, 2000 ABN, which is a DIV of Ser. No. 09/210,470 Dec. 14, 1998 U.S. Pat. No. 6,252,715, which is a CON of Ser. No. 08/816,688 Mar. 13, 1997 U.S. Pat. No. 5,870,227.

BACKGROUND OF THE INVENTION

1. Field of the Invention

The present invention relates generally to the field of optics and optoelectronics, and more specifically relates to the generation of a parallel beam pattern and the reformation, correction, modulation, focusing, scanning and redirection of individual beams within the parallel beam pattern, the whole parallel beam pattern itself, and spatial positioning of the individual beams within the parallel beam pattern.

2. Discussion of the Background

As is well known, a laser emits a single focused (coherent) beam of light. A single beam laser has a wide variety of applications including medical surgery, drilling holes in materials, cutting materials, fiber optic transmission in telecommunications, free space transmission, weaponry, music recording (CDs), and of course computer data storage. Solid state laser sources have also recently become commercially available which are structured within a linear or matrix array and which emit multiple parallel beams. The light emission from individual diodes within the linear or matrix array are controlled by independent electrical signal sources.

A laser light beam, although intrinsically narrow and sharply focused, at times requires various alterations to conform to the demands of its application. Examples of a beam's alteration include expansion/contraction, refocusing, de-astigmatization, and collimation. These alterations are typically affected by various types of individual optical lenses and/or combined lens assemblies.

Further, it would be highly desirable to simply and economically redirect a laser beam, similar to the manipulation of an electron beam in a CRT. Techniques, however, which simplistically manipulate the electromagnetic field of a laser beam, and consequently redirect it, are unavailable or economically unrealistic. As a consequence, light ray redirection has historically been accomplished almost exclusively by the use of stationary or servo positioned mirrors.

A simply and economically re-directable and modulatable laser beam may find multiple applications. Examples of these types of laser beams in both a single and multiple beam pattern include:

a. Replacement display tubes for Cathode Ray Tubes (CRTs) in which screen images are directly generated;
b. Biological cell targeting for laser destruction;
c. Optical inspection of physical patterns;
d. Direct digital (modulated) transmission;
e. Selective pattern exposure on light sensitive gels;
f. Parallel storage and retrieval of digital data (e.g., on stationary and dynamic media);

Within the optical data storage industry, altered laser beams are utilized in the storage and retrieval of encoded data. Such data is encoded by modifying a property of the optical storage material with a light from a laser or with heat from a focused laser beam. In either event, a laser beam emitted from the laser is precisely contracted, shaped, and focused by a series of lenses. The typical background commercial optical drive utilizes a single beam laser to read data from an optical storage media. In addition, a typical background device may use one or more lasers for writing data or for servo-tracking purposes.

Throughout developments in the optical data storage industry, researchers have attempted to develop storage systems which would utilize multiple read/write heads, acting simultaneously, in an effort to increase the transfer rate of data either written to or read from an optical storage media. One of the multi-head optical drive developers within the industry, the Asaca Corporation, announced in 1993 a magneto optic (MO) disk drive which utilizes parallel laser beams to simultaneously read/write information.

Research is being conducted into a further advance of this concept/objective via the use of solid state laser array matrices coupled with spatial light modulators. VCSELs (Vertical Cavity Surface Emitting Laser Diodes) and their equivalents which emit multiple parallel laser beams which may be used to store and recover data are one of the focal points of this research. Multiple types and varieties of lensing schemes and masks are being developed in concert with these VCSELs to manipulate, control, and redirect the laser beams emitted from these VCSELs.

With the advent of VCSELs and similar types of multiple laser beam producing arrays, the need for lensing schemes which are capable of altering and/or redirecting the multiple laser beams produced by these arrays has grown. A common requirement of these new generation of lensing schemes is that they must be able to perform their function simultaneously on the whole laser beam pattern or alternatively on individual laser beams within the whole laser beam pattern. One technique developed by Urshan Research Corporation of Los Angeles, as disclosed in U.S. Pat. No. 5,293,032, utilizes an electrically driven set of crystals to deflect a laser beam in a predetermined sequential movement.

The laser beams within the whole laser beam pattern are set on a submicro dimensional scale which is optionally less at the target than the solid state laser beam source separations. Both machinations must be performed at equivalent semiconductor switching speeds.

Another common application element of laser lensing systems within optical data storage devices is the use of rotating disk media. Systems with rotating media obviously provide at least one degree of movement of the media past a head, and coupled with servo systems of the device can further provide second and third degrees of movement, to yield a limited three dimensional freedom/excursion. Various spatial positioning systems, such as machining operations, photography, etc., likewise provide equivalent targeting schemes in which the reactive elements of the system are manipulated into a target range of the laser beam pattern rather than manipulating the laser beam pattern so as to bear on the target.

SUMMARY OF THE INVENTION

Accordingly, an object of the present invention is to provide a novel head lens system which functions so as to generate a multiple laser beam pattern, in which the individual laser beam components may be discretely modulated and optically corrected and refocused. The laser beam pattern can also be proportionately and scalably reduced, and the laser beam pattern can be simultaneously targeted to a two axis plane and swept through a desired angle at a controllable angular velocity while maintaining a calculated spatial separation and alignment.

Another object of the present invention is to provide the capability to randomly position the multiple laser beam pattern to a submicron target on an imaginary two dimensional plane of the target, and then sweep the plane in an orthogonally indexed pattern at a consistent high rate of speed and with a minimal (almost imperceptible) movement of any components of the head lens assembly.

Another object of the present invention is to provide a novel head lens system which can combine multiple light sources into a singular coherent source beam, so as to increase the power of the output multiple laser beam pattern.

Another object of the present invention is to provide a novel head lens system which can split a single laser source beam into the multiple laser beam pattern in which the individual laser beams are collimated, parallel to each other, and separated by a predetermined distance.

Another object of the present invention is to provide a novel head lens system which can individually modulate the individual laser beams within the multiple laser beam pattern in accordance with a signal pattern unique to each individual beam and at a sub-microsecond switching speed.

Another object of the present invention is to provide a novel head lens system which can scalably reduce the multiple laser beam pattern to a pre-selected spatial separation in a range of approximately one micron or less.

Another object of the present invention is to provide a novel head lens assembly which can directionally target the multiple laser beam pattern via gimbal mounted lenses which require a minimum of movement.

Another object of the present invention is to provide a novel head lens assembly which can reduce a sweep angle of the multiple laser beam pattern by extending the focal point of the multiple laser beam pattern while reducing a separation distance from the head lens assembly (the source) to the target.

These and other objects of the present invention are realized by a systematic assembly and placement of functional elements within a projected laser light train. This sequencing of optical components will be custom configured for requirements of each specific application of the head lens assembly of the present Invention. Such a head/lens assembly may also be incorporated into integrated optics circuits housed within a MEMS (Micro Electronic Mechanical System) device along with basic drive function receiver circuits.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 16 shows an alternative optical signal generation scheme (source) for a first stage of first and second embodiments.

DESCRIPTION OF THE PREFERRED EMBODIMENTS

Figure 1:
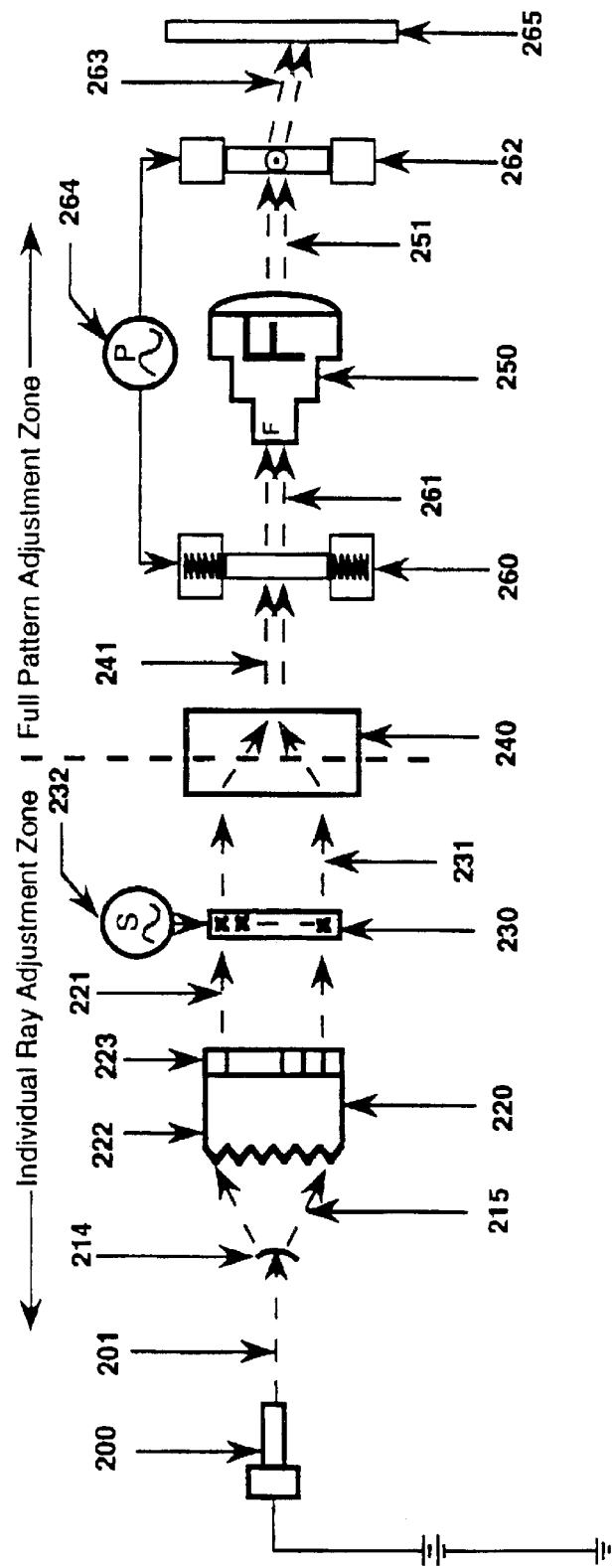
FIG. 1 shows an embodiment of the present invention of a head lens assembly utilizing a single light source.

Referring now to the drawings, wherein like reference numerals designate identical or corresponding parts throughout the several views, and more particularly to FIG. 1 thereof, a first embodiment of the present invention is shown.

In the embodiment of the present invention as shown in FIG. 1, the device of the present invention is divided into an individual ray adjustment zone and a full pattern adjustment zone. In the individual ray adjustment zone, individual light beam components are processed individually. In the full pattern adjustment zone, a multiple light beam pattern is processed as a whole.

As shown in FIG. 1, this first embodiment of the present invention includes a laser source 200 which outputs a laser beam 201 which is fed into a convex lens 214. The convex lens 214 expands the laser beam 201 to generate expanded laser beam 215. This expanded laser beam 215 is then fed to a diffraction lens assembly 220. This diffraction lens assembly can be formed of two components 222, 223, as an example. The first component 222 is a diffraction grating which includes a number of diffraction rulings. The second component 223 includes collimating lenses.

This diffraction lens assembly 220 provides two functions. A first function of the diffraction lens assembly 220 is splitting the expanded laser beam 215 into a multiple elliptical beam pattern, for example of 8 multiple elliptical beams. This function is performed by diffraction grating 222. The spacing of these multiple beams is directly related to diffraction rulings on the face of the diffraction grating 222, and the number of multiple elliptical beams is equal to the number of diffraction rulings. The collimating lenses 223 of the diffraction lens assembly 220 convert the elliptical beams output of the diffraction grating 222 into circular beams which are then output as a multiple circular beam pattern 221. Such a diffraction lens assembly 220 may be formed of a single molded aspherical lens, or multiple individual components set in a cascaded or series sequence.

The basic functions of the collimating lenses 223 are practiced by those skilled in the art. General single element diffraction gratings are described extensively throughout optics literature and are available from a wide variety of sources. One example of a cascaded technique for forming a diffraction lens assembly is disclosed in U.S. Pat. No. 4,982,395. In this patent two diffraction grating lenses are positioned and scribed such that six circular beams are generated from a single laser source beam. The pattern generated is a two dimensional configuration rather than a linear configuration, but the beam dimensional relations are extremely precise. The beams are separated by dimensions at microns or less.

A collimating lens assembly is disclosed in U.S. Pat. No. 4,643,538, which is utilized within an optical data recording system. As with the diffraction grating lens, collimation lenses are well known to those skilled in the art.

An aspherical lens is by definition an optics molding in which the function inherent within an individual component (which was previously set in machined glass or an equivalent) may be achieved via a specially contoured molded body. The advantage of an aspherical lens is that either multiple single function lenses and/or multiple diverse function lenses may be combined into a single mold.

The circular beam pattern 221 is then input into an optical switch assembly 230. This optical switch assembly 230 includes individual optical switches, one for each individual circular beam within the beam pattern 221. An electrical signal pattern S(f) is provided from a signal generator 232 which controls each individual optical switch in the optical switch assembly 230. Such an electrical signal S(f) from the signal generator 232 serves to cause the individual switch elements, which are active components, to modulate the individual circular beams in direct correspondence with the signal S(f) output by the electrical signal generator 232.

The optical switches may take a variety of optional forms ranging from a mechanical shutter to a solid state device. In certain contexts, for example in an optical data storage context, the switches may be required to have a high switching speed. Examples of such high switching speed switches are Mark-Zehnder interferometers, Fabry-Perot Etalons, light valves or Self-Electro-Optic-Effect Devices (SEEDs).

A resulting multi-beam output light beam pattern 231 of the optical switch assembly 230 is a pattern of parallel encoded light beam (modulated rays).

The wavefront of these parallel light bursts 231 will stay uniform (i.e. will not skew) as long as the path taken by each parallel light beam remains equal in length and passes through the same ambient environment. As this probability is unrealistic, a wavefront skew compensation is preferably introduced for each beam within the light beam pattern 231.

Figure 3:
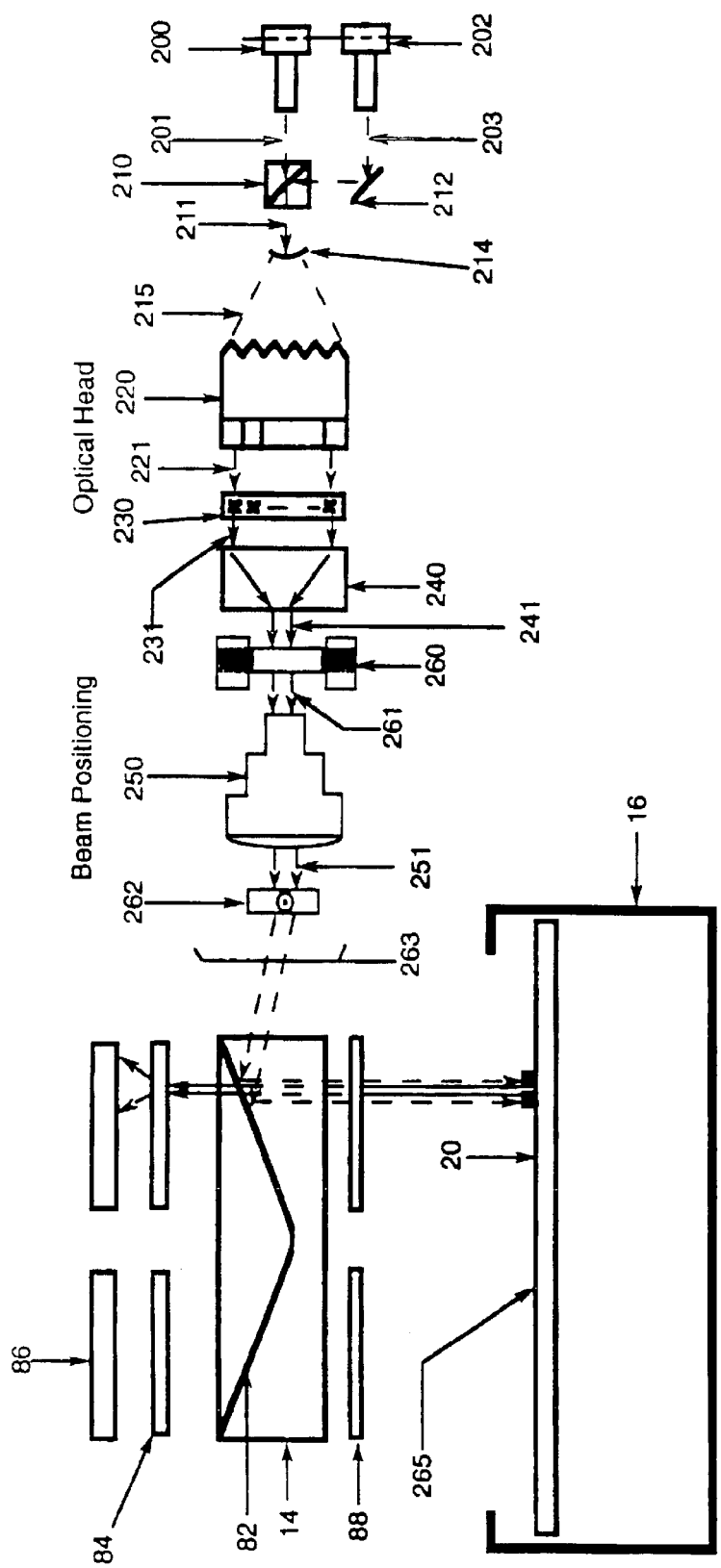
FIG. 3 shows one implementation of the head lens assembly of the present invention in which a laser beam pattern scans the surface of a target.
Figure 4:
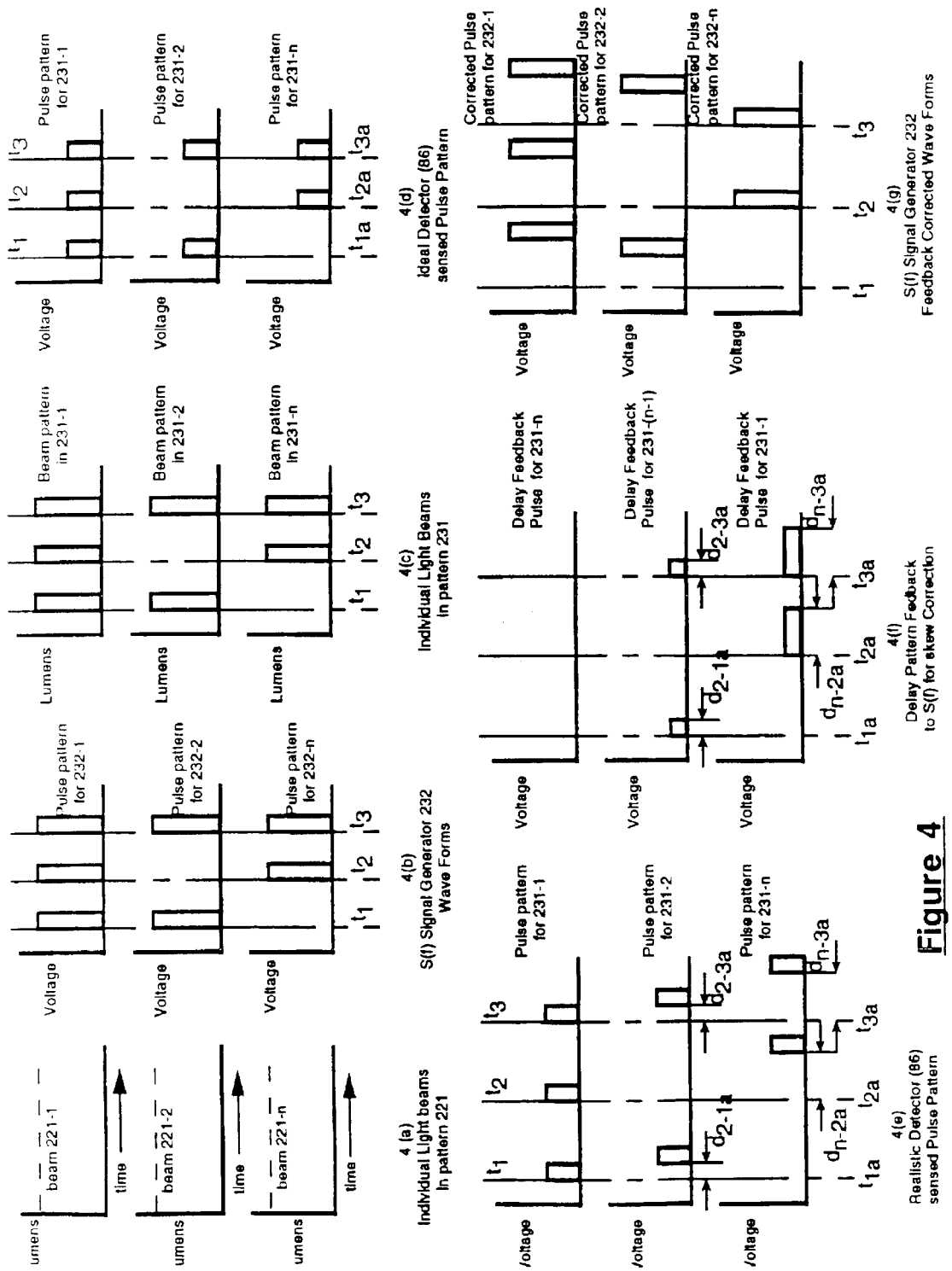
FIG. 4 shows an optical and electrical sequence of waveforms related to the correction of beam pattern skew.

Skew compensation is introduced via signal generator 232 acting on feedback, for example from a photodetector 86 such as is shown in FIG. 3, from an output reading of light impinging on a target 265. FIG. 4(a) shows a representation of individual light beams of the light beam pattern 231. These individual light beams are modulated by respective individual switches 230, which are activated by signal generator 232, yielding an analog light beam pattern 231. FIG. 4(b) shows a possible series of waveforms of signal S(f) for signal generator 232 which drives the optical switch assembly 230 to yield the modulated light beam pattern 231 shown in FIG. 4(c).

This beam pattern of FIG. 4(c), after some manipulation through the balance of the light train, eventually impinges on the target 265. A typical use of this scanning head lens assembly may employ some form of indicator or detector to sense the impingement of a light beam and its proper position on the target 265. In one anticipated use as shown in FIG. 3, and which is discussed below in greater detail, a photodetector 86 is positioned to receive a reflection of each light beam off of the target 365. The photodetector 86 may be a transducer which issues an electrical signal for each light beam impinging thereupon, and in which a relative position of each electrical signal generated contains information regarding a positional relationship between each light beam. In addition, it is known to those skilled in the art that a time analysis (or simultaneous measurement) of electrical signals generated could also reveal any disparity between an arrival time of the individual light beams within the light beam pattern.

FIG. 4(d) shows an ideal output of such a photodetector 86, where the path each light beam takes and its respective environment is the same, yielding a simultaneous arrival time at the photodetector 86 for each beam. The subscript "a" on the timing ordinate indicates the equivalent travel time of the pulse from the optical switch 230 (i.e. $t_1$) to the photodetector 86 (i.e. $t_{1a}$). As noted above, achieving such an equivalent path, and thereby an output as in FIG. 4(d), is improbable. A more realistic detected output at photodetector 86 is shown in FIG. 4(e), which illustrates an output with a linearly increasing delay across each time measured beam pattern (i.e. $t_1$ versus $t_2$ versus $t_3$ etc.). The delay times are noted with subscripts "d" which are measurable and consequently usable parameters.

These measured delays, as shown in FIG. 4(f), are fedback and used to compensate the timing in the S(f) signal output of signal generator 232 for the differential path variations. FIG. 4(f) shows delays applied in the illustrated case in the reverse order so that the shortest light path is electrically delayed to be equivalent to the longest light path, while the longest light path is not at all delayed electrically. The result of such a skew compensation is shown in FIG. 4(g), which shows the corrected signal positionings achieved by the above-discussed skew compensation. A triggering circuit activated by the delay signal's trailing edge would be one manner of introducing the delay into signal S(f) output from signal generator 232.

In order to initially calibrate the required delay of all beams within light beam pattern 231, an all "1" signal or an all beams "high" signal could be sent out after a point on the target 265 is acquired and prior to a start of a sweep.

The light beam pattern 231 output of optical switch 230 is then fed through a beam pattern contractor and focus element 240. A contracted and focused light beam pattern 241 output of the beam pattern contractor and focus element 240 is then input to a horizontal gimbal sweep lens 260. By controlling this horizontal gimbal sweep lens 260, the multiple light beam pattern 241 can be swept in a horizontal direction. A multiple light beam pattern 261 output of the horizontal gimbal sweep lens 260 is then input to a beam focus angle contractor 250 which multiply reflects the multiple light beam pattern 261 in order to decrease the sweep angle. The output of this beam focus angle contractor 250 is then input into a vertical gimbal sweep lens 262. By controlling this vertical gimbal sweep lens 262, the multiple light beam pattern 251 can be swept in a vertical direction. An output light beam pattern 263 is then output from this vertical gimbal sweep lens 262 to a target 265.

The gimbaled lenses 260 and 262 discussed above have been designated respectively as a horizontal gimbal lens 260 and a vertical gimbal lens 262. These terms horizontal and vertical merely provide an example of the positioning of such lenses. Such lenses 260 and 262 can be formed at any arbitrary angle as long as their respective axis of rotation are offset from each other by 90 degrees, thereby yielding a full two dimensional movement of the output beam pattern 263.

In the embodiment shown in FIG. 1, the target 265 is positioned such that the output light beam pattern 263 directly impinges on target 265. An alternative embodiment of how the light beam pattern 263 may impinge on the target 265 is shown in FIG. 5.

Figure 5:
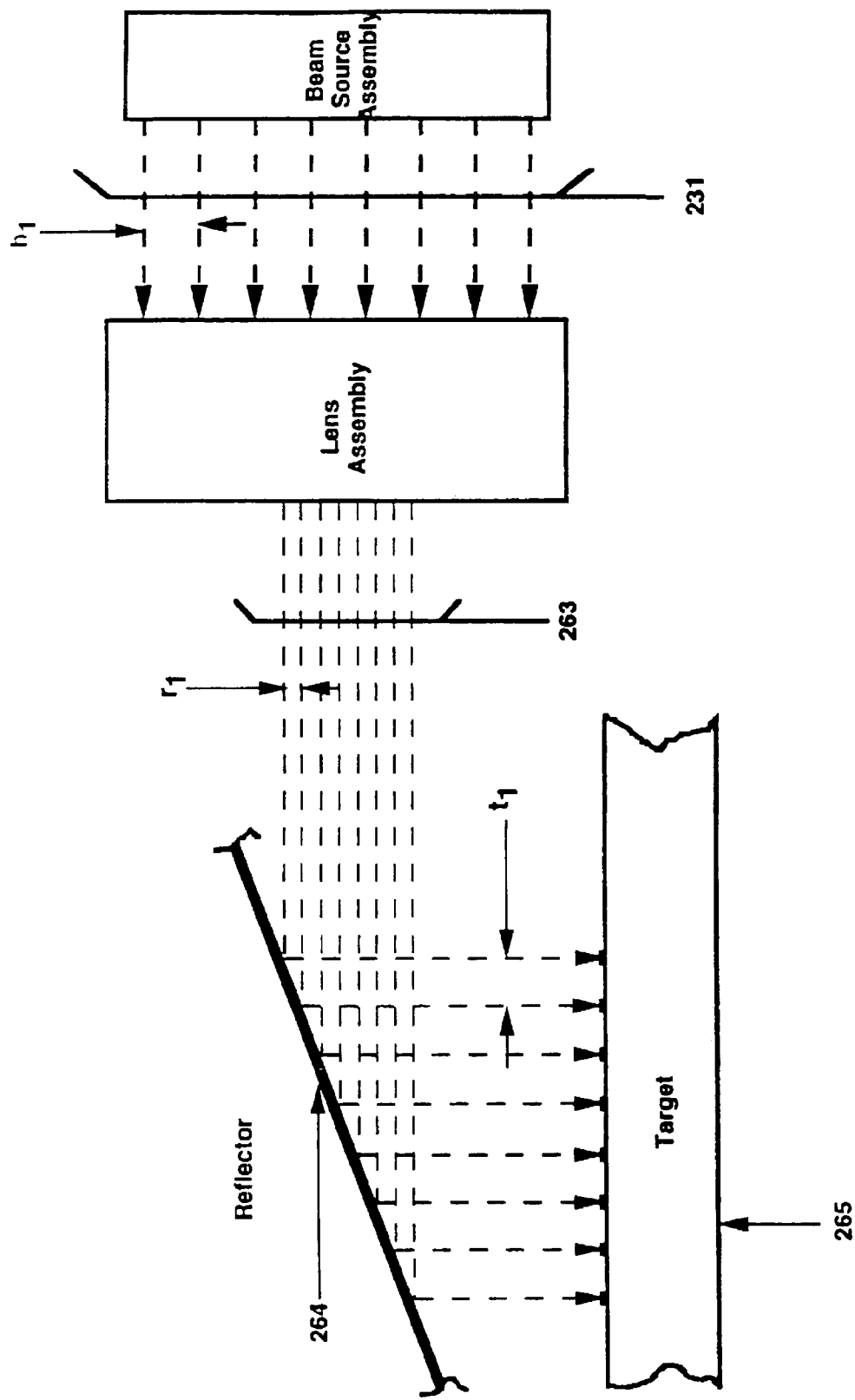
FIG. 5 shows a concept of different spatial separations of laser light beams within a laser beam pattern.

As shown in FIG. 5, a reflector 264 may be formed between the output light beam pattern 263 and the target 265. By the selective placement of the angle of the reflector 264, the spacing $t_1$ at which the multiple light beam pattern 263 impinges on the target 265 can be controlled. Moreover, with the operation of the present invention of controlling a horizontal gimbal sweep lens 260 and a vertical gimbal sweep lens 262, the multiple beam light pattern 263 will sweep across the target 265 in any desired manner, that is, sweeping of the output light beam pattern 263 can be controlled as to timing and direction based on the environment requirements of the scanning head assembly. Also as shown in FIG. 5, the beam separation $h_1$ of beam pattern 231 is not necessarily equal to the beam separation $r_1$ of beam pattern 263, and neither of which is necessarily equal to the beam separation $t_1$ as the light beam pattern 263 impinges on the target 265.

The elements in the full pattern adjustment zone as shown in FIG. 1 will now be discussed in further detail below.

Figure 10:
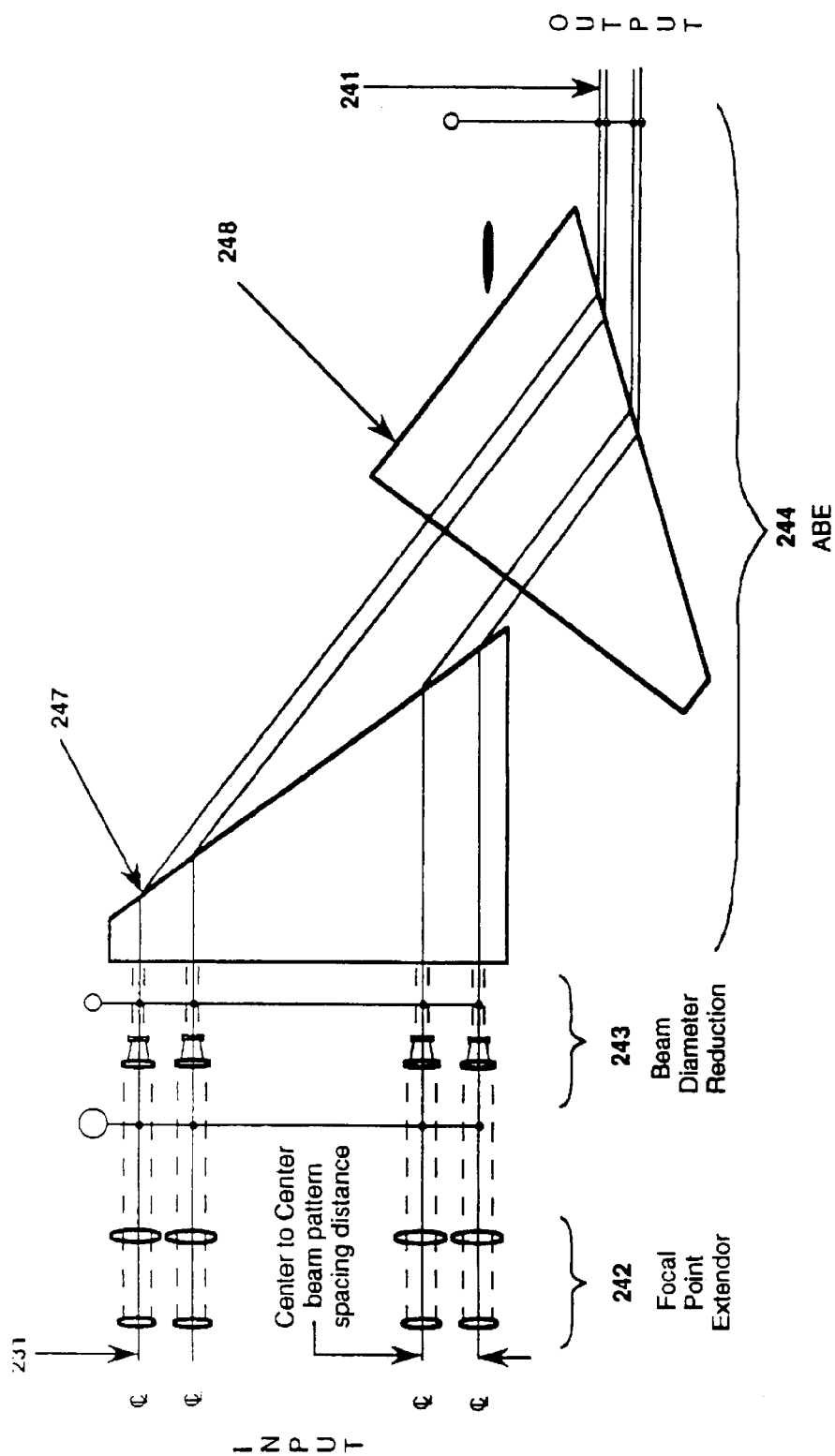
FIG. 10 shows a beam pattern contractor of first and second embodiments.

The beam pattern contractor and focus element 240 is shown in detail in FIG. 10 and performs a principle function of scalably reducing the geometry of multiple beam pattern 231 to a desired size.

As is apparent from FIG. 1, the light path from laser source 200 through the head lens assembly to target 265 is optically long. To compensate for this length, the beam pattern contractor and focus element 240 includes a focal point extender lens unit 242 as a first element the input beam pattern 231 encounters on entering the beam pattern contractor and focus element 240. This focal point extender lens unit 242 moves the focal point of each individual beam of the input beam pattern 231 beyond its uncorrected distance. The object of the correction is to increase the focal point so that an ultimate output beam 263 of the head lens assembly has a desired diameter. The focal point extension may be accomplished using what is known to those skilled in the art as "Beam Relaying Telescope" which includes a first and second infinite conjugate doublet lens, as is disclosed as one example in U.S. Pat. No. 5,088,079 at column 7, lines 5 to 62.

The beam pattern generated to this point is dependent upon sizes established within the diffraction grating 222 and collimating lenses 223, rather than target 265 required sizes. Although certain applications may possibly require that the beam pattern 231 would require an increase in size, it is more probable that the beam pattern 231 in most cases would need to be reduced in size. The system shown in FIG. 10 achieves a reduction in size of the beam pattern. However, the system shown in FIG. 10 could simply be "turned around", i.e., the input beam would impinge on anamorphic beam expander 244 first and the output beam would be output from lenses 242, to achieve an expansion of the input beam pattern.

The anamorphic beam expander 244 (herein ABE) depicted in FIG. 10 reduces or magnifies both a diameter of the beams as well as a center to center spacing between multiple beams on a proportional basis. The ABE 244 is formed of two prisms 247, 248. For example, if the linear beam pattern 231 impinges on ABE 244 and the diameter of each beam is magnified 100% (increased by a factor of 2), then the spacing between beams is similarly and scalably magnified 100% (increased by a factor of 2). As obvious to those skilled in the art, the ABE 244 magnifies or reduces the entire beam pattern 231 "in bulk" in the same proportion for all beams equally. It is therefore imperative that the individual beam diameters and their spacing be established prior to their input to the ABE 244 so that scaling by the ABE 244 will bring output beam pattern 241 to an eventual desired sizing.

Figure 6:
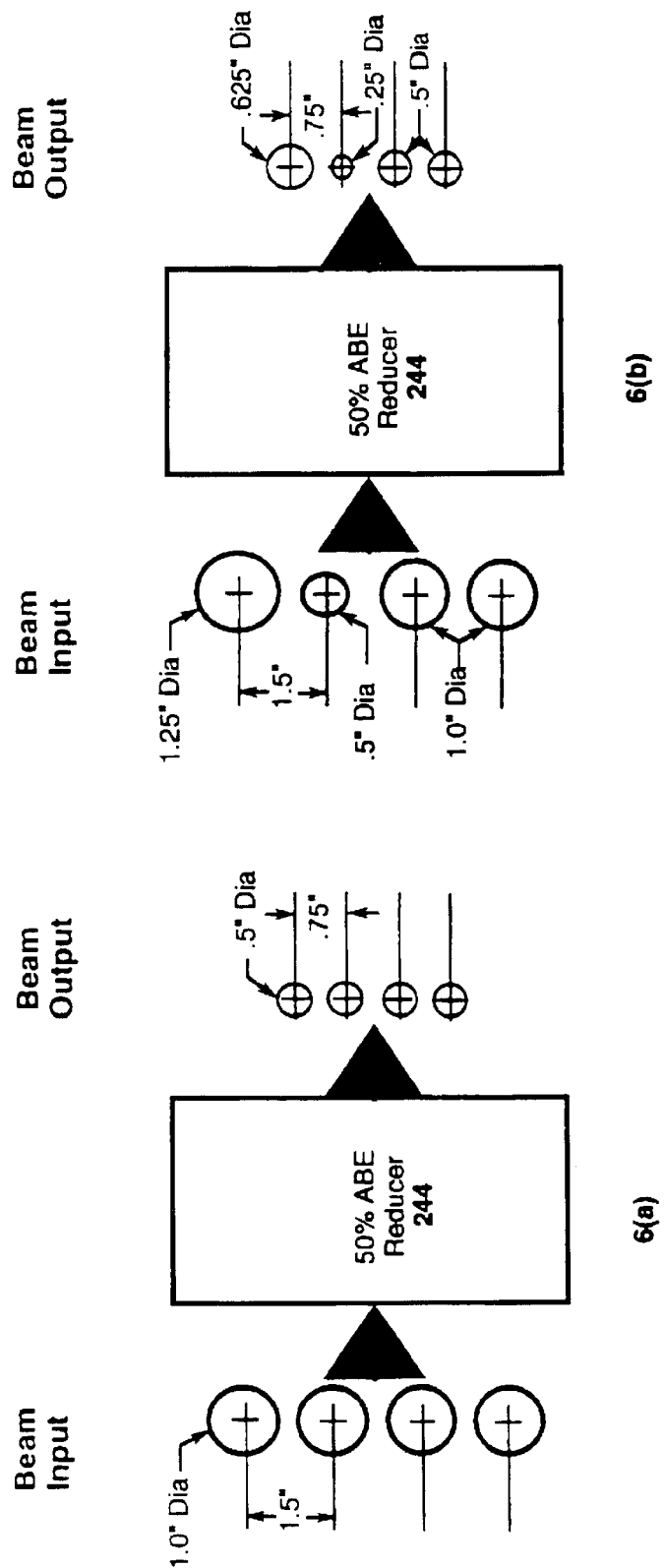
FIGS. 6(a) and 6(b) show how both a beam diameter and a beam separation within a beam pattern are scalably reduced by a prismatic anamorphic beam expander.

FIGS. 6(a) and 6(b) illustrate this scaleable and proportional reduction performed in the ABE 244. As shown in FIG. 6, whether input beam diameters are consistent or not across an input beam pattern, the ABE 244 will proportionately reduce the beam pattern. Therefore, if the beam diameters are consistent, a consistent compression as shown in FIG. 6(a) takes place, and if the beam diameters vary, as shown in FIG. 6(b), the output beam pattern will be a scaled down version including the same variances. It is an objective of the beam pattern contractor and focus element 240 to not only reduce the beam pattern, but to also reduce it to a consistent beam diameter and separation. It is therefore necessary that the beam pattern 231 be adjusted to not only a correct diameter, but to one where the beam diameter is proportioned to the separation.

Figure 7:
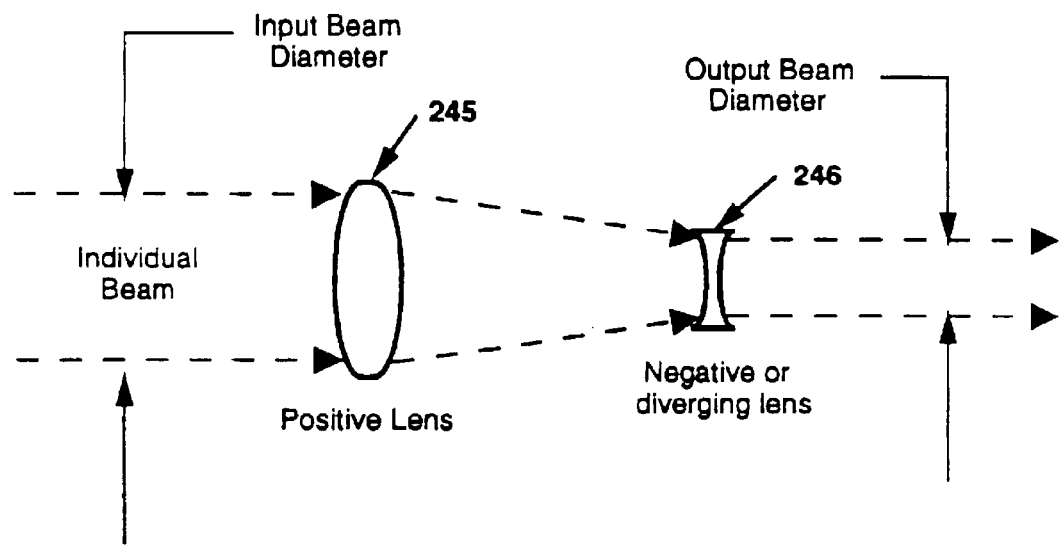
FIG. 7 shows one illustration of a lens for reducing a diameter of an individual beam within a beam pattern contractor.

A function of the beam diameter reduction assembly 243 is to adjust the diameter of the incoming beams to a proper size. One lens assembly which can accomplish such a function is well known to those skilled in the state of the art as a "Galilean telescope". A significant feature of such an assembly is that images passing therethrough are not reversed. A typical assembly for beam diameter reduction element 243 is shown in FIG. 7. Such a "Galilean telescope" includes a positive lens 245 and a negative or diverging lens 246, as shown in FIG. 7. The desired beam diameter sizes will obviously be dependent on the overall scanning head application and its associated specifications.

The governing formulae for a "Galilean telescope" and other similar assemblies are published throughout optics literature and are well known to those skilled in the art.

The beam separation distance, as previously noted, is fixed by the upstream diffraction grating lens 222. As such a separation is most probably several magnitudes greater than a final track separation, it is assumed that mechanical tolerances placed on the diffraction grating 222 will suffice to establish the consistency required (i.e. without adjustments) by the beam pattern contractor and focus element 240.

The ABE 244, as noted above, can typically be formed of two prisms 247, 248. The angle of the prisms, the prism material, and the angular positioning of the two prisms 247, 248 between themselves, determine the eventual center spacing between the multiple beam pattern 241 output by the beam pattern contractor and focus element 240.

Figure 8:
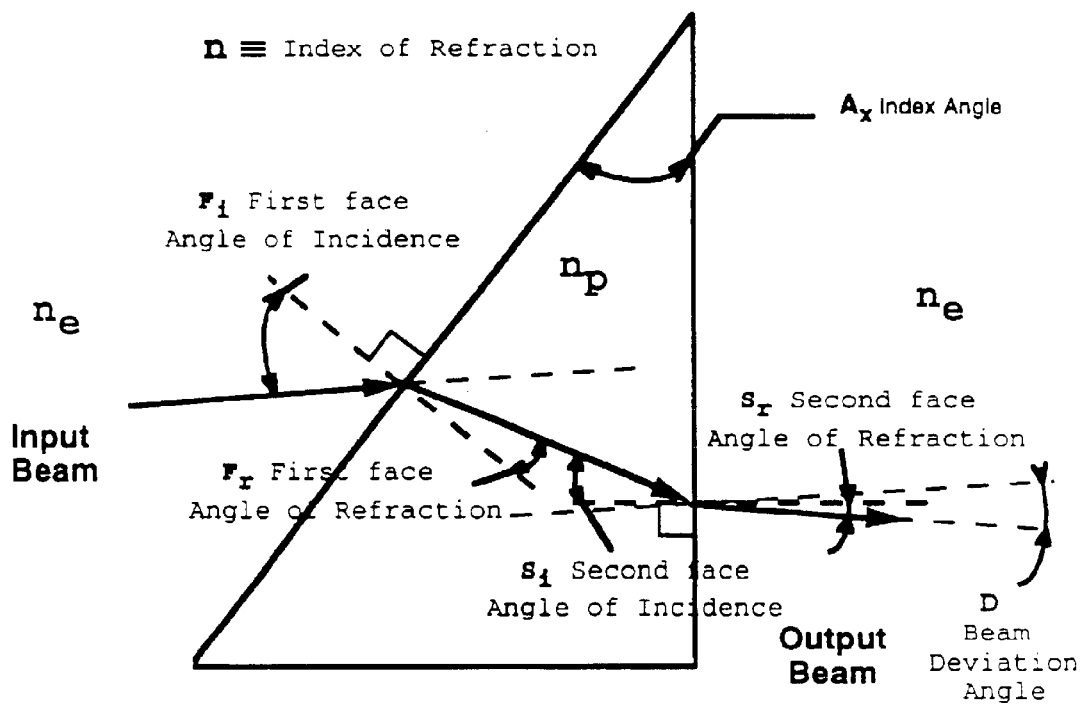
FIG. 8 shows pertinent parameters affecting an optical beam passing through a prism.

The pertinent calculations for computing the relative positions of the prisms 247, 248 of the ABE 244 within a cascaded assembly (multiple prisms) are based on the following equations whose parameters are depicted and identified in FIG. 8:

a. Snell's Law of Refraction (as applied to the first face of each prism):

$$n_p \sin(F_i) = n_p \sin(F_r)$$

b. The beam magnification (contraction) through a single prism:

$$M = \frac{\cos(F_r)\cos(S_r)}{\cos(F_i)\cos(S_i)}$$

where M equals the magnification (contraction) and F and R are the angles of incidence ($F_i$) or refraction ($F_r$), respectively, as shown in FIG. 3. The prism (or its assemblies) has telescopic effects.

Figure 9:
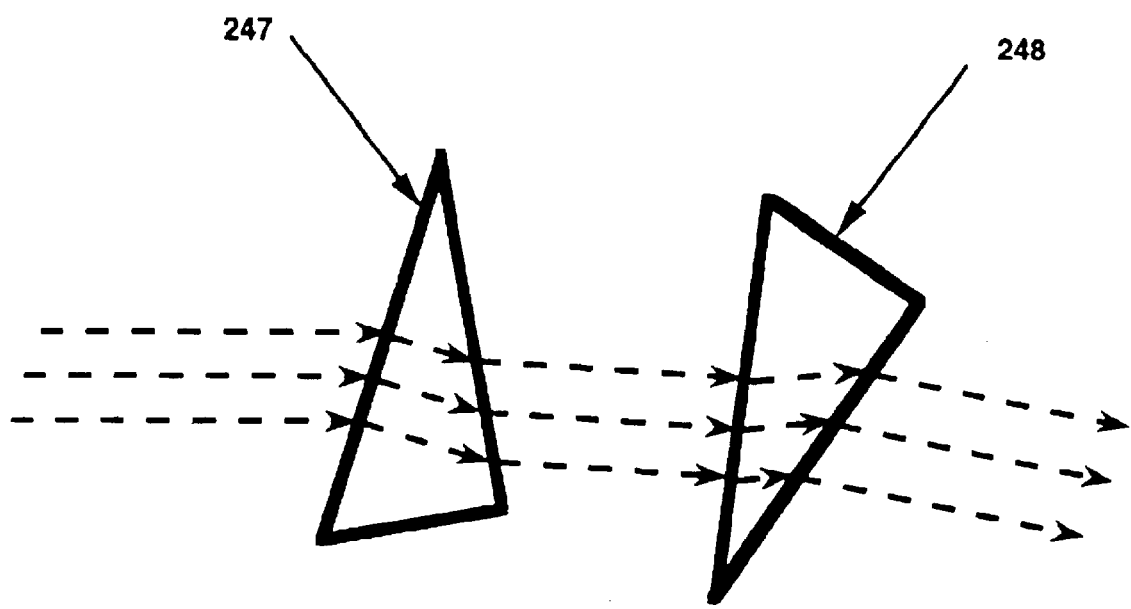
FIG. 9 shows a relative positional relationship between two prisms to reduce chromatic distortion in an anamorphic beam expander.

Note that the formula in (a) and (b) above are derived to determine the relationship between a beam size (diameter) entering the prism versus that of an exit beam, i.e., a scaleable increase or reduction. As this scaleability is focused about the beam's centerline, it follows that a multiple beam pattern would predictably be scalably increased/decreased. The logic follows then that the centerline between beams in a beam pattern likewise are scalably reduced/increased. These equations can therefore be utilized to determine not only the beam diameter magnification through a prism, but also the increase/decrease in the separation of a beam pattern.

c. The prisms index angle $A_x$, as defined in the FIG. 8, can be determined from the equation:

$$D = S_r - F_r - A_x$$

where D equals the beam deviation angle (i.e. the angle the incident beam on the first face of the prism is refracted from its original vector as it exits the prism)

d. Magnifiers (or contractors) and amplifiers have a common effect if the output from one device is coupled to the input of a second similar device. That effect being that the eventual output from the ganged or cascaded devices is the product of each devices gain:

Total Gain=$Gain_A \times Gain_B \times Gain_C$, etc.

e. As light passes through a prism, the prism refracts the different wavelengths (i.e. colors) within the light at different angles. This phenomena is referred to as chromatic dispersion. The phenomena can be calculated and then accommodated within a magnification (contraction) design. Defining equations are well known to those skilled in the art. A nominal method for compensating for this dispersive effect n magnifying assemblies is to use prisms in pairs 247, 248, see FIG. 9, wherein the second prism 248, which is optically reversed, compensates the dispersion of the first prism 247.

If a single prism made from glass is set in air, the index of refraction of the two ambients can be estimated at 1 and 1.5, approximately. Using a 30/60° prism geometry, by varying the incidence angle a magnification ranging from 1.6 up to 3.0 can be achieved. Setting four of such 3.0 prisms in series (i.e. cascaded) would yield a total assembly magnification of 3×3×3×3 or 81.

As the beam contractor 240 can be set in a MEMS device as discussed further below, an optional material setting would be to utilize a silicon ambient with a refraction index of 4 coupled with a glass index of 1.5. This increased index boosts a derived magnification to well over three. Adding doped crystalline materials could enhance the refraction index even further, close to 5.

Unfortunately, silicon and silicon doped material have a transmittance less than air or glass and therefore are comparatively less effective (i.e. more lossy) in transmitting equivalent high frequencies. A limitation is likewise inherent in the angle of incidence. A high angle (i.e. greater than 65°) reflects more light away from the prism surface. The surface coating likewise plays a significant factor in determining the amount of the incident beam absorbed into the prism.

As is apparent, there are multiple significant and interdependent factors influencing the magnification through a single prism which will vary based on a final system in which the present invention is implemented.

The two truncated prisms 247, 248 in FIG. 10 may impart a slight distortion of the collimated beams toward an ellipse. This elliptical distortion is calculated and the downstream beam focus angle contractor 250 may compensate an equivalent reverse distortion caused by the beam pattern contractor and focus element 240.

The beam spacing within the beam pattern 231, although depicted to be equally spaced in FIG. 10, does not of necessity have to be equally spaced. The dimensional set of the beam pattern 231, whether equal or unequal, however, has to be established before the demarcation point of beam pattern contractor and focus element 240.

The beam pattern contractor and focus element 240 marks the point within the head lens assembly light train between two distinct optical conditioning methods. Upstream from this component, in the individual ray adjustment zone pattern (see FIG. 1), the beam pattern geometry is determined and the Individual beam within the multiple beam patterns are individually corrected or conditioned. Downstream from this component, in the full pattern adjustment zone (see FIG. 1), the entire beam pattern is manipulated or directed as a whole, while ostensibly maintaining the geometry of the individual beams.

The output multiple beam pattern 241 of beam pattern contractor and focus element 240 can be offset from the beam input 231 centerline as depicted in FIG. 10 if only two prisms are employed, as is well know in the state of the art. As the head lens assembly however is stationary to this point, it only requires positioning or targeting the output beam for the offset. A centerline beam output option is taught in U.S. Pat. No. 4,643,538 which also includes a focal point extender lens assembly.

The subsequent elements of the head lens assembly are specifically employed to direct the multiple beam pattern output of beam pattern contractor and focus element 240 to an imaginary point on a two dimensional plane on target 265.

Within the scanning head lens assembly, the two gimbal lenses 260 and 262 serve to deflect input beams toward target 265. The horizontal gimbaled lens 260 deflects its incoming pattern in a bi-directional horizontal direction, and controls arc sweep input to the beam focus angle contractor 250. The vertical gimbaled lens 262 also deflects its incoming sweeping beam pattern toward target 265 in a bi-directional vertical direction. It is also noted that the input beam 251 to the vertical gimbaled lens 262 exits the focus angle contractor 250 through a linear sweep.

Both lenses 260 and 262 can be constructed to effectuate their movements to generate the desired sweeps of the multiple beam pattern by being set on piezoelectric pivotal drive mechanisms.

Figure 11:
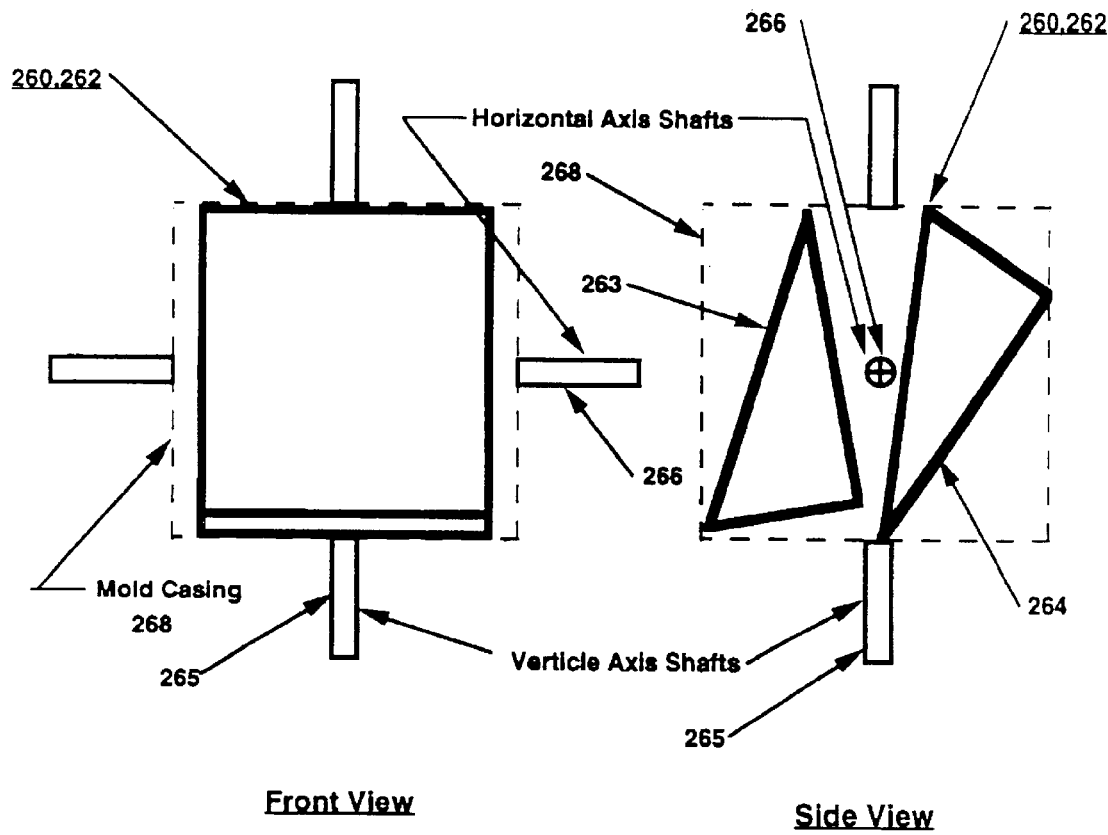
FIG. 11 shows one implementation of a gimbaled lens which allows a rotated lens assembly to sweep across a target surface in either a vertical or horizontal direction.

The optics of horizontal and vertical gimbaled lenses 260 and 262 may be constructed of several basic elements known to those skilled in the art. One construction of each of lenses 260 and 262 is as a non-reflective lens assembly which would predictably divert rays passing therethrough dependent upon an angle of entry. One such assembly is shown in FIG. 11. This assembly utilizes a pair of PABE prisms 263, 264 set in a fixed mold casing 268 and including horizontal and vertical axis shafts 266, 265 and with a gain of one. As described above in detail in the prism's discussion item "c", an exit beams deviation "D" from an input or incidence beams original path is equal to an angle of refraction from the second face minus the angle of incidence to the first face minus the prism index angle, or, $$D = S_r - F_r - A_x$$

As the angle of refraction from the second face is dependent upon the index of refraction, a constant, (in addition to the angle of incidence) and the index angle which would likewise be fixed (or a constant within the molded body), the beam deviation angle (exit beam) is directly and linearly dependent upon the angle of incidence. Turning the molded assembly therefore proportionately changes the incidence angle $F_i$, and hence the beam deviation angle D.

A second optional construction for the horizontal and vertical lenses 260 and 262 would employ a more common beam diversion technique of a rotatable mirror set in a path of the incoming beam pattern and reflecting that beam pattern back upon a fixed reflective surface so that the beam pattern is again reflected to the designated location.

The horizontal and vertical lenses 260 and 262 can be driven by a piezoelectric driver. The piezoelectric rotary drive mechanism likewise has several optional constructions. A piezoelectric effect material exhibits an internal polarized electric field when physically strained (i.e. deformed). The converse is also true.

Figure 12:
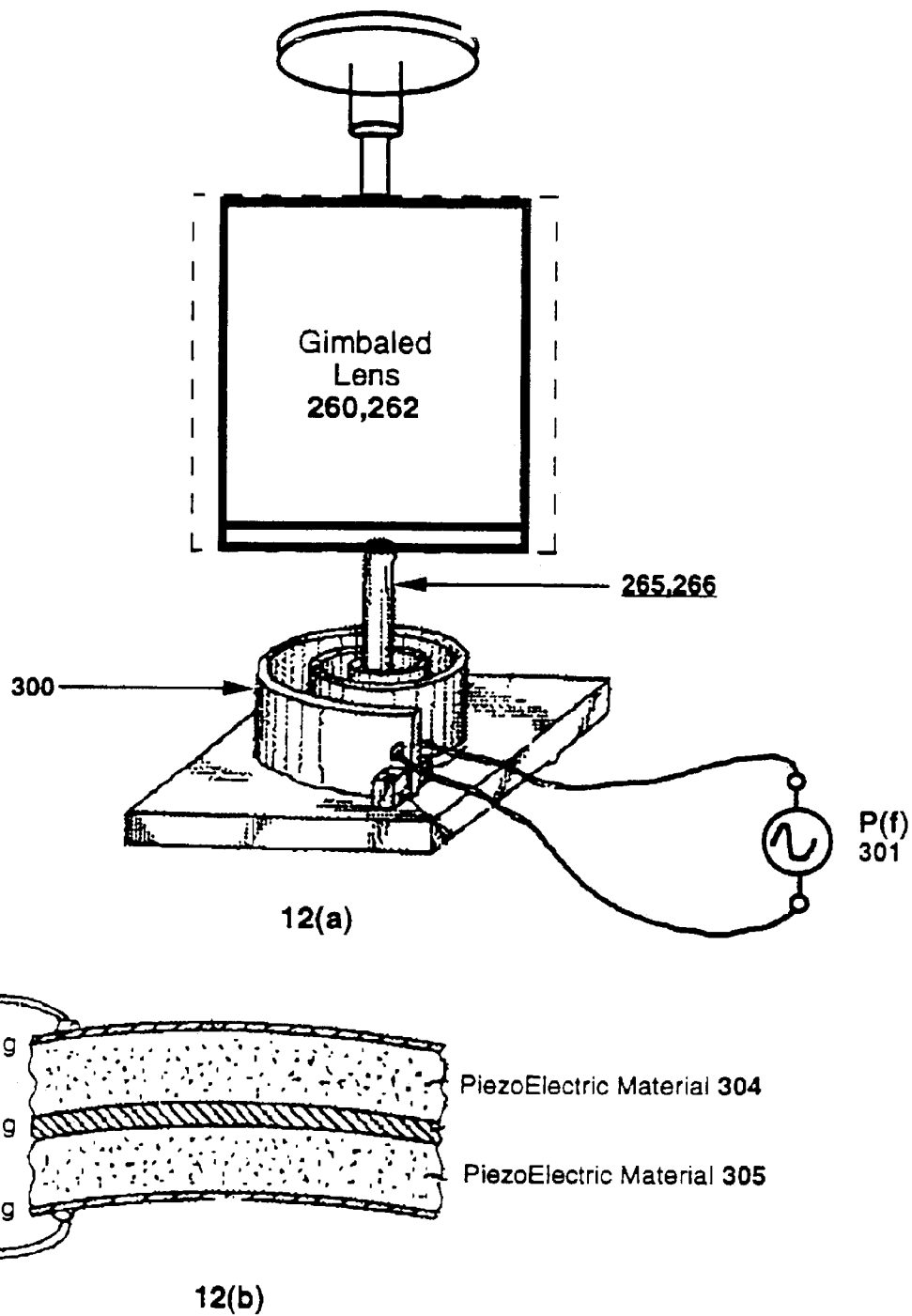
FIGS. 12(a) and 12(b) show one implementation of a piezoelectric drive mechanism for horizontal and vertical gimbaled lenses.

One construction of a piezoelectric driver for horizontal and vertical lenses 260 and 262 is depicted in FIGS. 12(a) and 12(b) describing a mechanism taught in U.S. Pat. No. 4,435,667 in which a piezoelectric spiral drive 300 essentially rotates a shaft or axle under control of a signal output from signal generator 301. The piezoelectric driver operates somewhat on the principle of a bimetallic strip in that the piezoelectric material operates both in cooperation with and opposed to a pre-formed (spiral) spring. As shown in FIG. 12(b), the piezoelectric spiral drive 300 includes a structure of a central spring 303, sandwiched by piezoelectric material layers 304, 305, which in turn are sandwiched by contact springs 306, 307. The spiral drive device 300 coils and uncoils under influence from the signal output from signal generator 301, and thereby rotates a shaft or axle 265, 266 affixed to one end of the spiral drive device 300. Affixing a vertical (or horizontal) shaft from the gimbaled lenses 260, 262 as shown in FIG. 11 to this spiral drive 300 while setting the opposite side axis in a stationary bearing allows precise rotary movement of the gimbaled lens 260, 262. As is obvious to those skilled in the art, a reflecting mirror may likewise be so mounted and driven in a rotary motion.

Figure 13:
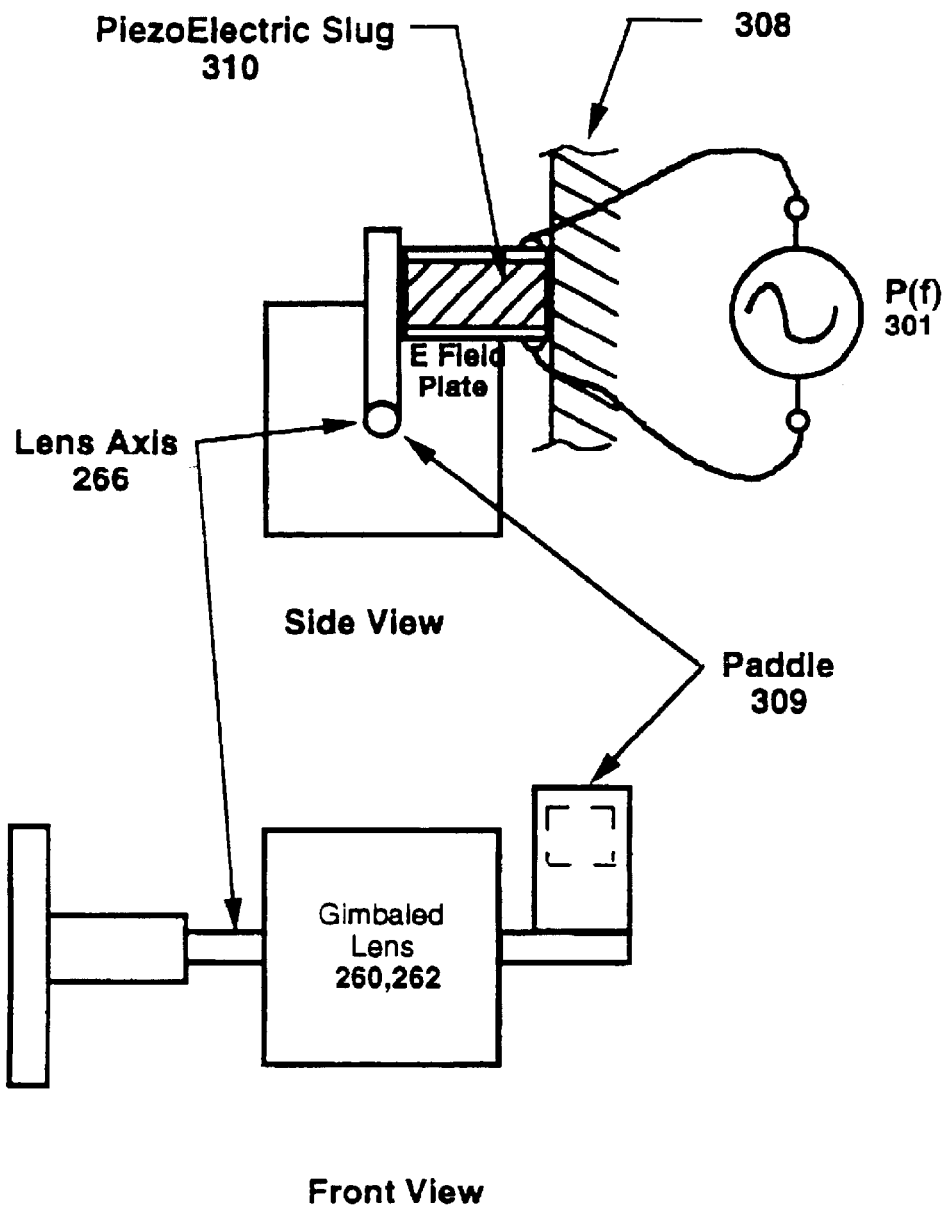
FIG. 13 shows one implementation of a rotary actuated piezoelectric drive mechanism for the horizontal and vertical gimbaled lenses.

An alternative piezoelectric drive mechanism affixed to the horizontal lens axis 266 is shown in FIG. 13. In this instance a piezoelectric device (slug) 310 is affixed to a stationary wall 308 at one end, and another end is affixed to one axis of, e.g. the horizontal axis 266, gimbaled lens axis. An EMF applied to the piezoelectric device from signal generator 301 causes the gimbaled lens 260, 262 to rotate. The rotary motion of this second embodiment actuator is more angle range restrictive than the first embodiment of FIG. 12, but however offers a tighter incremental movement control.

The two gimbaled lenses 260, 262 are driven by two separate forcing signals P(f) output of signal generator 264, see FIG. 1. The forcing signals P(f) are arranged to independently move either lens 260 or 262 at a fixed incremental velocity and from or to any position within a restricted arc (e.g. less than 10 degrees). The forcing signals P(f) output of signal generator 264 are supplied by a controller (not shown) based on the target 265 to be accessed. The forcing signals P(f) output of signal generator 264 and the electrical signal S(f) output of pattern generator 232 are synchronized in order to properly coordinate the position of the output beam pattern 263 on the target 265, with the timing of the data to be written or read. Further, the forcing signals P(f) output of signal generator 264 may be modified/manipulated so that the sweep rate of the beam pattern across target 265 is adjusted. Dependant upon the target material being scanned and the laser power delivered to the target 265, the time the beam is allowed to stay on a particular position may be increase or decreased (dwell time) by adjusting P(f). In general, the combination of the two gimbaled lenses 260, 262 provides dynamic pivotal movements closely approximating the dynamics and positioning capability of a motorized gimbal.

With this construction, the target 265 in the present invention is accessed by sweeping the beam pattern 263 of parallel beams thereacross. The sweep is accomplished by programmed rotary deflection of horizontal lens 260 and vertical lens 262 as described above. This rotary lens movement (measured by angular velocity) may trace a linear coordinate pattern on the target 265.

Figure 14:
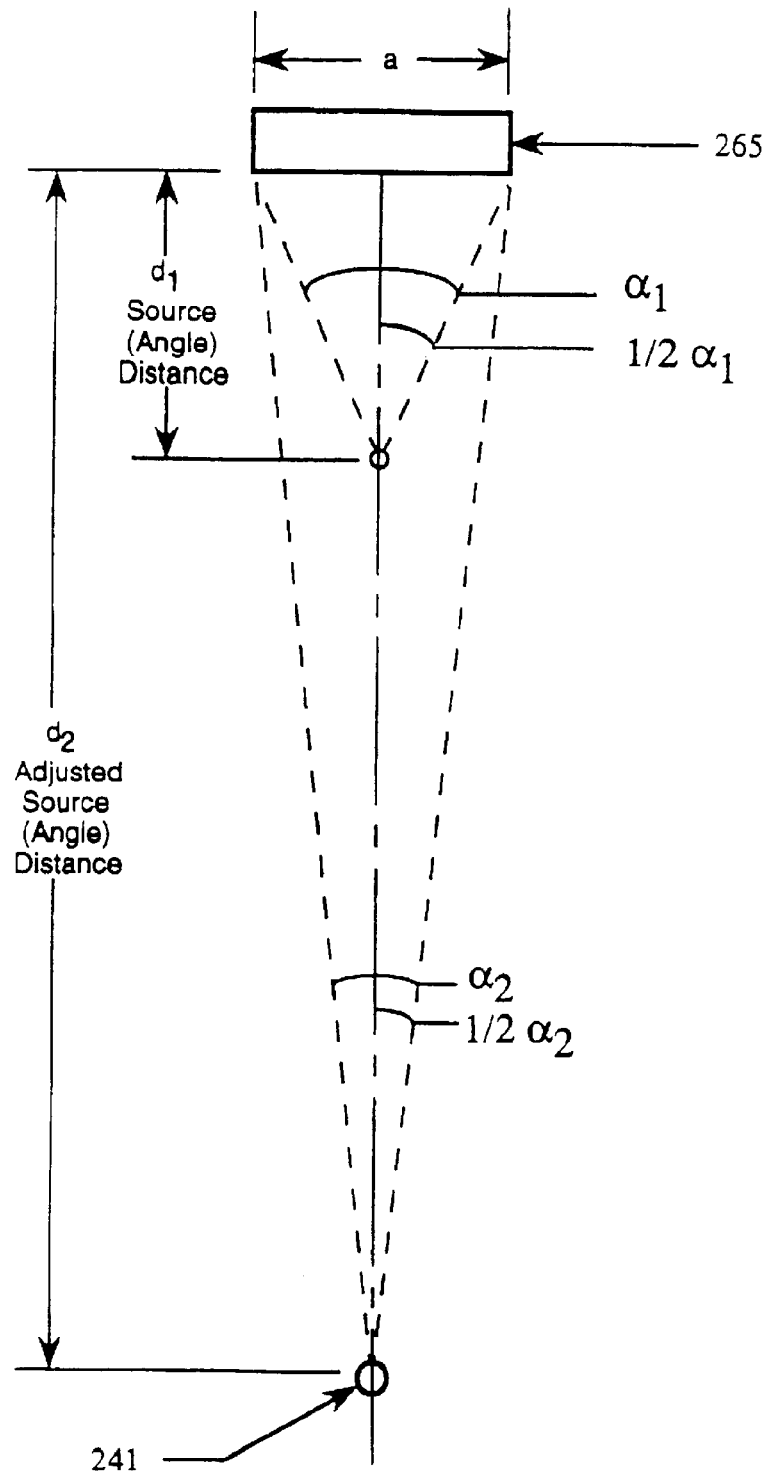
FIG. 14 shows a relationship between focal distance, angular velocity, and target linear velocity (sweep rate)

In certain applications it may be desired to maintain a fixed linear velocity (sweep) across the target 265. As shown in FIG. 14, as the light source 241 for output beam pattern 263 can be considered a fixed point, its position relative to the swept target 265 describes an angle α. The displacement through this angle α establishes an angular velocity ω equivalent to a linear velocity above.

Obviously, the closer the light source 241 is to the target 265 ($d_1$ as compared to $d_2$), the greater the equivalent angle must be ($\alpha_1$ as compared to $a_2$) to sweep across the same length of the target 265. It follows of course that the greater the distance between the light source 241 and target 265, the greater the required angular velocity of the pivoted lenses 260, 262. Examining the angular velocity equations of $$\alpha = 2 \operatorname{Tan} (a/2d)$$

$$\omega = \text{Revs/Min} = \alpha/360T$$

ω=angular velocity

T=time to sweep target

Note that T, the time set to sweep the target, is constant (either linearly or through an angle). Conversely, the farther the target 265 from the light source 241, the smaller the equivalent angle and also the smaller the angular velocity. The forcing functions P(f) output of signal generator 264 must obviously be in a range to cause the gimbaled lenses 260 and 262 to operate at a realistically achievable angular velocity.

In a practical situation, the smaller the angular velocity the more realistically achievable the operation. Achievability is not only measured in terms of a constant angular velocity but also with regard to time required to reach operation speed from rest and the time required to decelerate to rest from the operation speed.

To quantify the relative velocities and linear speeds (sweep) within a hypothetical data storage system, assume a one inch target (a in FIG. 14) with a one inch source distance (d in FIG. 14). Plugging these values into the equations noted above, an angular velocity of 10590 RPM would be required to achieve a 30 megabit per second linear sweep rate (at a micron pitch), an unrealistic rate. Current data storage drive motors run in the range of 6000 RPM when they are spinning at rated speed.

If, however, the source distance is moved to ten inches away from a target, the angle changes from 53 degrees to about six degrees, and the angular velocity requirement drops to 1200 RPM, a very realistic and achievable rate.

In the example above, a ten inch light path between the light source 202 and target 265, although feasible, may not be a generally acceptable machine package parameter in certain applications. As can be visualized from FIG. 1, a ten inch light path may force the overall size of the head lens assembly to be greater than 14 inches, which may be too large in certain applications.

Figure 15:
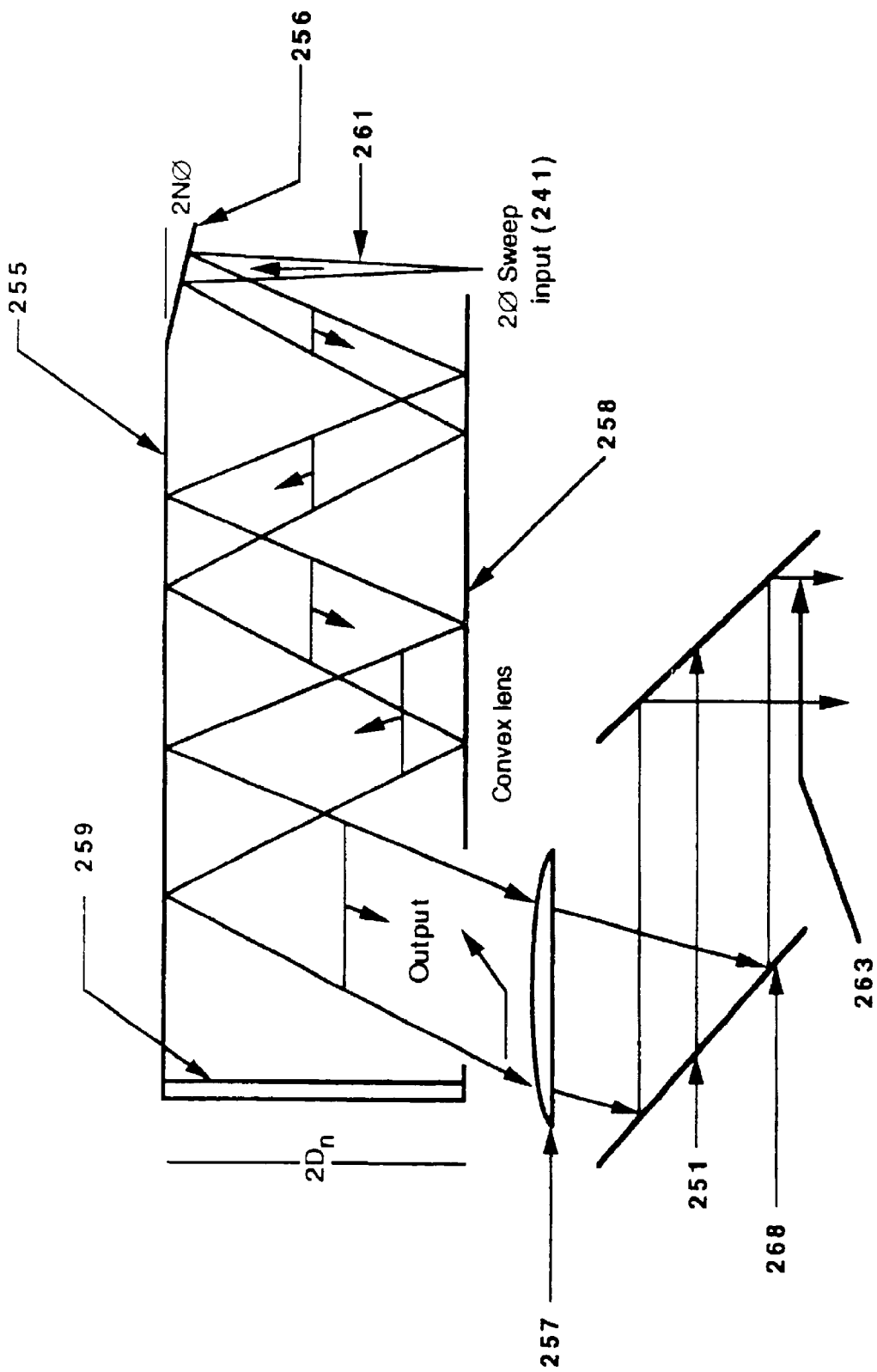
FIG. 15 shows a focus angle contractor of first and second embodiments.

The focus angle contractor 250 of FIG. 15 solves this extended light path problem and allows the adjustment of the source distance by essentially folding the light path at repetitive distances by way of reflective surfaces. The finished reflector assembly converts the uni-dimensional light source path (ten inches) to a package having both length and breath, but one which is adaptable into a small physical package.

The light beam pattern 261 to be input into the beam focus angle contractor 250 is a linear vertical array of individual beams dimensionally spaced apart from each other. FIG. 15 is a topological view of beam focus angle contractor 250. The view appears to be a singular diffusing light beam but is in reality a depiction of extreme ends of the sweep the multiple light beam pattern 261 is dragged through as it proceeds through the sweep angle. Certain reflectors 255, 258 in FIG. 15 are vertical walls, arranged so that the entire multiple beam light pattern 261 is simultaneously and synchronously reflected through equal distances. At an end of these wall reflectors 255, 258 is a non-reflecting pad terminator 259 which is a non-reflecting element.

The swept multiple beam light pattern 261 is injected into the beam focus angle contractor 250 by first encountering an angled reflective surface 256. The angle is set so as to direct the entire beam pattern 261 down an aisle of the beam focus angle contractor 250 between reflecting walls 255, 258. For an orthogonal beam input, the minimum allowed reflector angle is twice the sweep angle. If the reflector angle is any less, portions of the swept pattern will either reflect directly back into the source or in the opposite aisle direction. Either of these alternatives are of course unacceptable.

Reflectance theory dictates that the beam pattern sweep splays out as shown in FIG. 15 to the limit of the design. The eventual degree of splay in the case of the shown example would be a one inch spread to the target 265. Optic's laws as applied to the focus angle contractor 250 dictate that the design of the splay is directly related to the separation between reflector walls 255, 258, the number of reflections, and the degree of the entrance angle. The entrance angle of course is determined by the positioning of the deflection angle reflector 256 in FIG. 15. An obvious alternative would be to directly input the beam pattern at an angled entry into the reflector aisle.

As the beams reflect off the walls 255, 258 of the focus angle contractor 255, the cross section geometry of the beams progressively becomes more elliptical. This distortion may be compensated for after the beams exits the focus angle contractor 255 or may alternatively be pre-compensated. If pre-compensated (converted to the proper axis ellipse), the distortion caused by the reflection from the walls 259, 258 will effectively collimate the beams. Such a pre-compensation may be affected by the prisms 247, 248 of the beam pattern contractor and focus element 240 of FIG. 10 as noted previously. That is, the prisms 247, 248 of beam pattern contractor and focus element 240 and focus angle contractor 250 can be designed to have opposite distortions, so that these elements each compensate for distortions introduced in the other element.

On their exit from the reflector aisle (at the optimum design spread), the beam pattern splay angle is eliminated by virtue of a plano convex lens 257. Reflectors 268 may be employed to redirect the beam pattern 251 into the proper position to enter vertical gimbal sweep lens 262. The output beam pattern 263 is thereafter directed to target 265 as shown in FIG. 1, or through a reflector 264 as shown in FIG. 5.

The focus angle contractor 250 of FIG. 15 is depicted as a two dimensional array in which the input beam pattern 261 is progressively splayed and noticeably does not interfere with itself (its own light pattern). Note that only one element of the swept splay is active at any instant; consequently, the angles can be substantially reduced and more reflections allowed without mutual interference. This same progressive reflection sequence can also be optionally accomplished by a reflecting the beam pattern within a cylindrical, spherical or a polysided figure.

Figure 2:
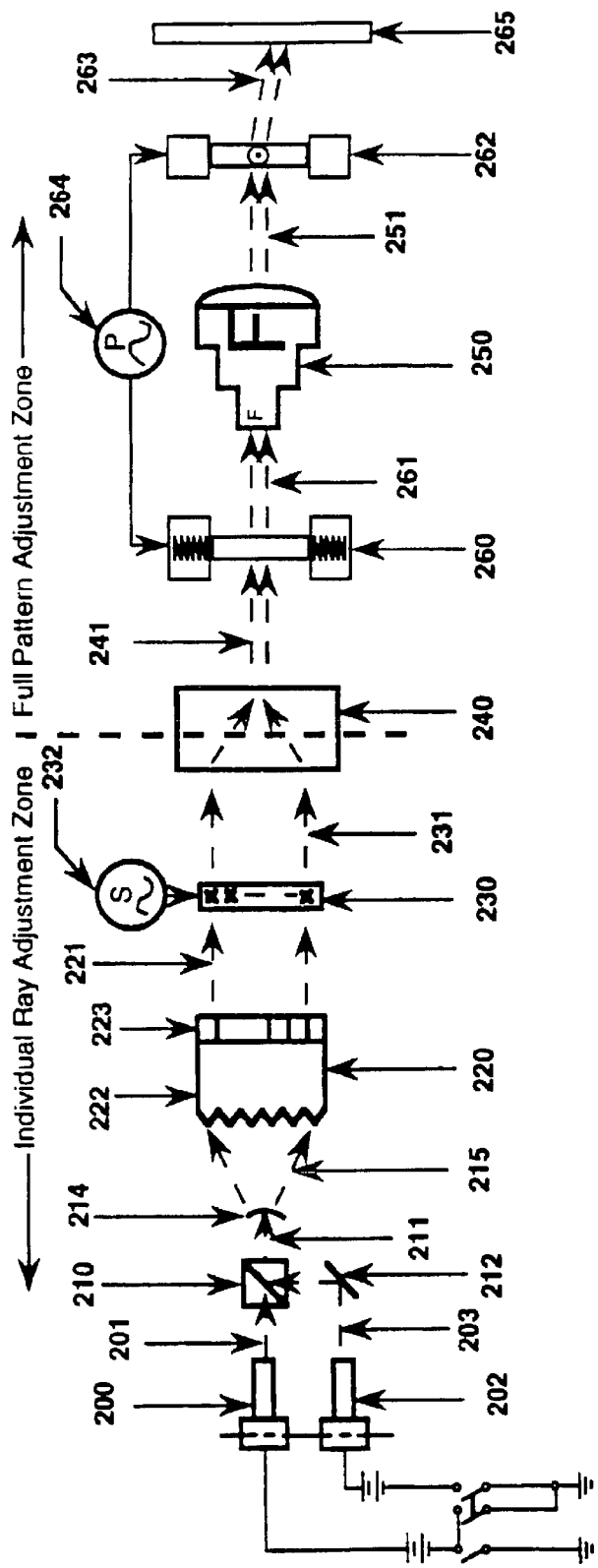
FIG. 2 shows an embodiment of the present invention of a head lens assembly utilizing a plurality of light sources in which outputs of the plurality of light sources can be combined.

The embodiment discussed above in FIG. 1 shows a single light source 200. However, a further embodiment of the present invention is shown in FIG. 2 in which a second light source 202 is also provided. Further light sources 202 can also be added. Further, in this second embodiment the first and second light sources 200 and 202 have switches to control their outputs. The embodiment of FIG. 2 also further includes a reflecting mirror 212 which reflects light from the second light source 202 and a beam splitter 210 which receives light reflected off reflecting mirror 212 and which receives light from the first light source 200. This embodiment of FIG. 2 provides a further benefit that a power of the output light beam pattern 263 can be changed.

The embodiment of the present invention as shown in FIG. 2 allows implementation of both a low power mode and a high power mode. In the low power mode, the secondary light source 202 is switched off and the first light source 200 is switched on. With this structure, the embodiment as shown in FIG. 2 operates exactly as the embodiment of FIG. 1 discussed above. This is a low power mode of such an embodiment of FIG. 2.

In a high power operation mode of the embodiment of FIG. 2, both the light sources 200 and 202 are switched on. Further, the outputs of these light sources 200 and 202 are then combined at beam splitter 210. As a result, the expanded laser beam 215 in the second high power mode operation has a power which is a combination of the powers of the first light beam 201 output from the first light source 200 and the second light beam 203 output from the second light source 202.

In this way, in this second embodiment as shown in FIG. 2, if a low power output multiple beam pattern 263 is desired, the light source 200 is switched on and the light source 202 is switched off. Such an embodiment of FIG. 2, however, also provides the benefits that if a high power multiple light beam pattern 263 is required to be output, both the light sources 200 and 202 (or more) can be switched on to achieve the multiple light beam pattern 263 having a higher power output.

In the embodiment of the present invention as shown in FIGS. 1 and 2, the multiple beam pattern 231 is generated by expanding light from a single beam source 200 or from two single beam sources 200 and 202. As a further alternative of the present invention, the multiple light beam pattern 231 can be generated by a vertical cavity surface emitting laser diode array (VCSEL) as shown in FIG. 16 of the present specification.

In this alternative, light power is supplied by a VCSEL (Vertical Cavity Surface Emitting Laser diode) 400, which is provided in a linear array of laser diodes. The VCSEL is driven by the electrical signal pattern S(f), also output from signal generator 232, serving as a forcing function rather than a switching function. The end result is again a multi-beam output of light pulses 401, fed into a collimating lens 402. The output beam pattern is a reduced power form of modulated light beam pattern 231.

The device of the present invention as shown in FIGS. 1 and 2 can have multiple applications, as noted in the "Discussion of the Background" section. As one specific type of application, such a device as in the present invention can be used to scan a target media, such as a fax or an optical storage media.

Such an implementation of the present invention is shown for example in FIG. 3 of the present specification. FIG. 3 of the present specification shows the system of the present invention in which the output multiple pattern light beam 263 impinges on a reflective surface of a beam splitter 82 toward a target 265. The light beams then reflect off the target 265 through an objective lens 88, then pass through the beam splitter 82, through a diverging lens 84 and then to photodetector 86.

Such an application of the present invention scanning a target 265 to obtain data for facsimile transmission or for optical reading/writing on an optical storage media provides significant benefits. First, such an operation of the present invention provides extremely high speed and precise scanning of the target 265. Further, in the embodiment of the present invention in which target 265 is an optical storage media, the second embodiment of the present invention including the first and second light sources 200, 202 can provide an operation in the low power mode in which only the first light source 200 is switched on, such that a reading operation of the target 265 optical disk can be effectuated, and in a high power mode in which light sources 200 and 202 are switched on, a writing operation could be effectuated to the target 265 optical disk.

Further, with such a structure in the present invention, the target 265 optical disk can remain stationary, i.e., there is no requirement to spin the target 265 optical disk. With this structure in the present invention, the tolerances inherent in conventional systems in which an optical disk rotates relative to a head can be eliminated, and an optical reading and writing at an extremely high density can be achieved.

Such an optical head lens assembly as discussed above provides the following features. Such an optical lens assembly can allow the combination of the power of multiple laser sources, see laser sources 200 and 202 shown in the embodiment of FIG. 2, to form one coherent beam and directly focus the resultant combination onto the diffraction lens assembly 220. Such a system of the present of the present invention also provides a multiple pattern of parallel and geometrically aligned beams with a predicted spacing between the individual beam components.

Such a system of the present invention can also direct a beam pattern to a point on a two dimensional plane with high precision, for example within 0.5 microns of a target. Such a system of the present invention also provides a capability to bi-directionally sweep a beam pattern across a target at a high linear velocity of the order of 15 m/sec. Further, such a system provides a capability to maintain a linear tracking position of the beam pattern during the sweep to a high precision, for example within + or −0.05 microns.

Moreover, such a system of the present invention provides a capability to proportionally constrict an overall size of a multiple beam pattern, i.e., both the individual beam diameters and the spacing between beams. Such a system of the present invention also provides a capability to increase a focal distance between a light source and a target surface within a linear distance which is substantially less than the focal distance itself, to thereby reduce a light source sweep angle for a fixed linear sweep distance. Such a system of the present invention also delivers collimated beams of a small diameter, for example, one-half micron diameter, at a near micron pitch to a target. Such a system of the present invention also provides a synchronous modulation function of individual beam components within a beam pattern.

Moreover, when such a system of the present invention is used to scan an optical media, such a system of the present invention can provide both high precision read and write control to cause a transformation in the medium material. Moreover, in this embodiment, the system of the present invention provides a capability to instantaneously index the beam pattern to an adjacent set of tracks bi-directionally on completion of a fixed distance sweep of track length. Such a system of the present invention could also engage a medium arc of an extremely small size, or example of about ½ micron diameter of a pitch of less than 1 micron.

The figures depict the lenses throughout the assembly as individual components. Although this is a viable method of implementing the overall assembly's function, the preferred intent (i.e. embodiment) is to utilize state-of-the-art assembly processes wherever appropriate to implement the invention. To this end, molded aspherical lenses and/or integrated optics techniques can be employed to optimize the packaging of the assembly in addition to implementing the described operational teachings.

These maximized functional elements may also be set into or optically coupled into a MEMS (Micro Electronic Mechanical System) device body so as to approach the target of a monolithic assembly as closely as possible. MEMS packages are normally based in silicon substrates, but may be embedded in other material structures such as plastic or glass. The package nominally incorporates functional areas such as optics, integrated circuits, semiconductors, and electromechanical devices such as actuators, switches, and motors. The ICs and semiconductors are diffused into and/or plated onto the silicon as with any normal electronic device. The optics and electromechanical elements however are either assembled externally as an entity and then set within machined cavities or troughs are cut into the device and then connected into the electronic patterns. Alternatively, the individual optics and electromechanical elements may be constructed of a hybrid combination of external elements and the basic silicon structure (i.e. diffused and plated electronics). Each current MEMS device is a unique custom structure designed exclusively for its application.

Figure 17:
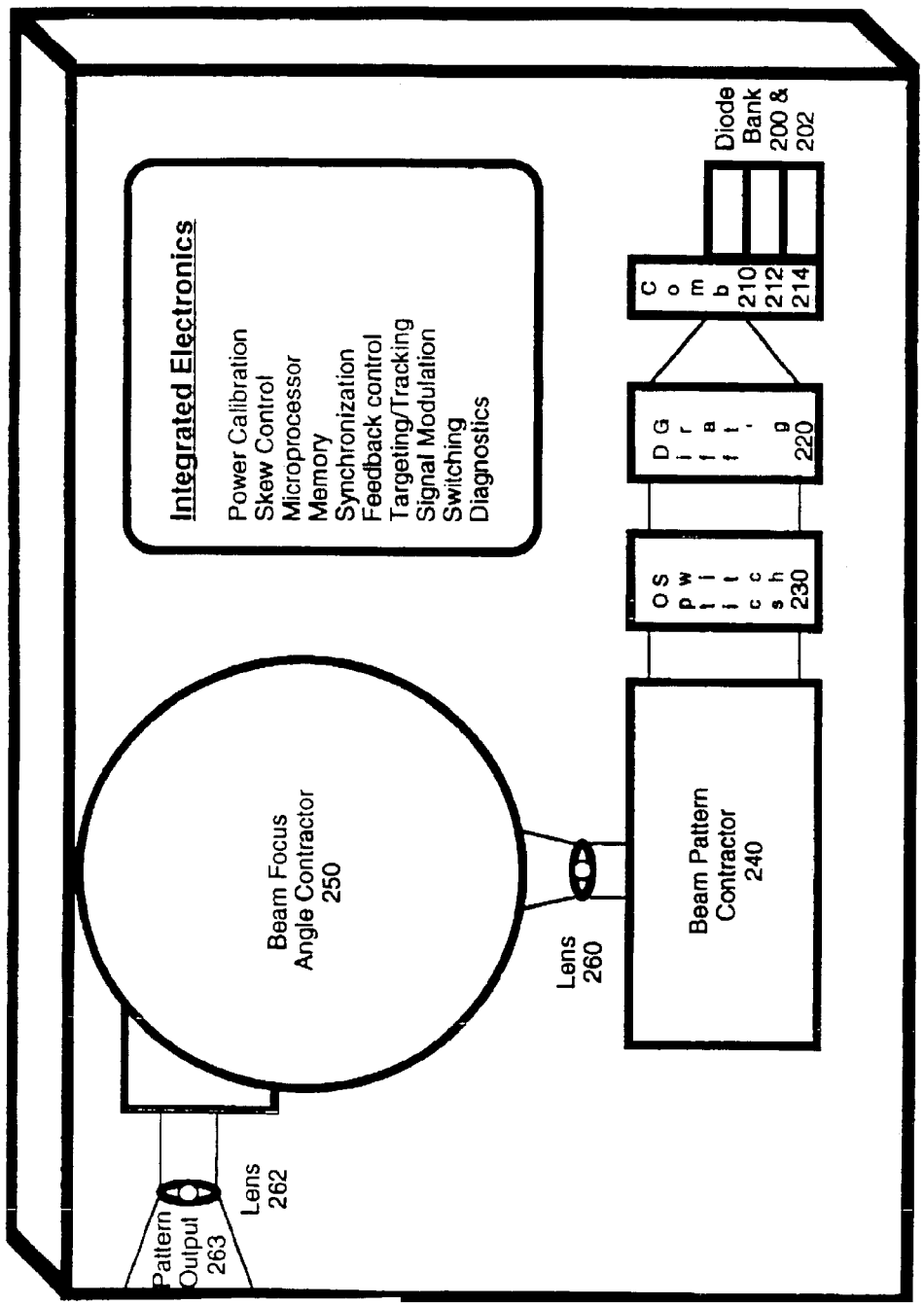
FIG. 17 shows a relative functional layout of the scanning lens assembly on a MEMS chip.

A MEMS device incorporating the functions outlined with the previous text in parallel with FIGS. 1 and 2 is illustrated in block form in FIG. 17.

While the invention herein disclosed has been described by means of specific embodiments and applications thereof, numerous applications and variations could be made thereto by those skilled in the art without departing from the spirit and scope of the present invention. It is therefore to be understood that within the scope of the appended claims, the present invention may be practiced other than as specifically described herein.

What is claimed is:

1. A focus angle contractor for increasing an optical length of an input beam pattern, comprising:

a deflection angle reflector for first reflecting the input beam pattern;

a plurality of reflecting wall surfaces for further multiply reflecting the input beam pattern to generate a multiply reflected beam pattern;

a convex lens through which the multiply reflected beam pattern passes; and re-alignment reflectors for realigning the multiply reflected beam pattern output of the convex lens.

2. A method for increasing an optical length of an input beam pattern, comprising the steps of:

reflecting the input beam pattern;

further multiply reflecting the input beam pattern to generate a multiply reflected beam pattern;

passing the multiply reflected beam pattern through a lens; and realigning the multiply reflected beam pattern of the lens.

3. The method of claim 2, wherein the step of multiply reflecting the input beam pattern is performed in order to decrease a sweep angle of the input beam pattern.

* * * * *